US009210474B2

(12) United States Patent
Hanko et al.

(10) Patent No.: US 9,210,474 B2
(45) Date of Patent: Dec. 8, 2015

(54) ON SCREEN DISPLAYS ASSOCIATED WITH REMOTE VIDEO SOURCE DEVICES

(71) Applicant: Lattice Semiconductor Corporation, Portland, OR (US)

(72) Inventors: James G. Hanko, Redwood City, CA (US); Michael G. Lavelle, Saratoga, CA (US); J. Duane Northcutt, Menlo Park, CA (US); Brian K. Schmidt, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/070,373

(22) Filed: Nov. 1, 2013

(65) Prior Publication Data

US 2014/0059616 A1 Feb. 27, 2014

Related U.S. Application Data

(62) Division of application No. 11/828,219, filed on Jul. 25, 2007, now Pat. No. 8,599,315.

(51) Int. Cl.
*H04N 5/445* (2011.01)
*H04N 21/482* (2011.01)
*H04N 5/44* (2011.01)
(Continued)

(52) U.S. Cl.
CPC ........... *H04N 21/482* (2013.01); *H04N 5/4401* (2013.01); *H04N 5/44508* (2013.01); *H04N 5/44543* (2013.01); *H04N 21/4316* (2013.01); *H04N 21/4622* (2013.01); *H04N 21/4221* (2013.01); *H04N 21/478* (2013.01)

(58) Field of Classification Search
CPC ...................... H04N 21/4221; H04N 21/4316
USPC ..................................................... 725/37, 59
See application file for complete search history.

(56) References Cited

U.S. PATENT DOCUMENTS 5,793,366 A 8/1998 Mano et al.
5,883,621 A 3/1999 Iwamura
(Continued)

FOREIGN PATENT DOCUMENTS

CN 1399422 2/2003
EP 1022898 7/2000
(Continued)

OTHER PUBLICATIONS

Int'l Preliminary Report on Patentability mailed Feb. 4, 2010 for Int'l Application No. PCT/US2008/068940.
(Continued)

*Primary Examiner* — Pankaj Kumar
*Assistant Examiner* — Franklin Andramuno
(74) *Attorney, Agent, or Firm* — Fenwick & West LLP

(57) ABSTRACT

In some embodiments, an apparatus includes interface circuitry to receive signals including video signals and drawing commands, and a command interpreter to receive the drawing commands and provide on screen display (OSD) signals in response to the drawing commands. Video processing circuitry processes the received video signals to provide processed video signals, and a blender to blend the OSD signals and the processed video signals to produce blended video signals including the OSD signals and the processed video signals. Other embodiments are described and claimed.

15 Claims, 9 Drawing Sheets

(51) Int. Cl.
*H04N 21/462* (2011.01)
*H04N 21/431* (2011.01)
H04N 21/422 (2011.01)
H04N 21/478 (2011.01)

(56) References Cited

U.S. PATENT DOCUMENTS

| | | | | |
|---|---|---|---|---|
| 5,923,379 | A * | 7/1999 | Patterson | 725/70 |
| 6,005,861 | A | 12/1999 | Humpleman | |
| 6,064,420 | A | 5/2000 | Harrison et al. | |
| 6,288,716 | B1 | 9/2001 | Humpleman et al. | |
| 6,380,945 | B1 | 4/2002 | MacInnis et al. | |
| 6,606,128 | B2 | 8/2003 | Hanafee et al. | |
| 6,839,071 | B1 | 1/2005 | Miyamoto | |
| 7,224,404 | B2 | 5/2007 | An et al. | |
| 7,577,973 | B1 * | 8/2009 | Kapner et al. | 725/44 |
| 7,895,445 | B1 | 2/2011 | Albanese et al. | |
| 8,739,230 | B2 * | 5/2014 | McEnroe et al. | 725/80 |
| 2002/0051084 | A1 * | 5/2002 | Aneja et al. | 348/556 |
| 2003/0025836 | A1 | 2/2003 | An et al. | |
| 2004/0103434 | A1 * | 5/2004 | Ellis | 725/58 |
| 2005/0120374 | A1 | 6/2005 | Stone et al. | |
| 2006/0290817 | A1 | 12/2006 | Yui et al. | |
| 2007/0118849 | A1 * | 5/2007 | Kisel et al. | 725/25 |

FOREIGN PATENT DOCUMENTS

| | | |
|---|---|---|
| EP | 1063597 | 12/2000 |
| EP | 1143745 | 10/2001 |
| JP | 09-163258 A | 6/1997 |
| JP | 11-146275 A | 5/1999 |
| JP | 2000-286880 A | 10/2000 |
| JP | 2002-108326 A | 4/2002 |
| JP | 2003-298938 A | 10/2003 |
| JP | 2006-215531 A | 8/2006 |
| JP | 2006-350491 | 12/2006 |
| JP | 2007-057980 A | 3/2007 |
| KR | 10-2001-0085702 A | 9/2001 |
| KR | 10-2002-0055398 A | 7/2002 |

OTHER PUBLICATIONS

Office Action from 200880106074.6 mailed Sep. 15, 2011, 22 pgs.
Partial ISR and WO mailed Jan. 30, 2009 for PCT/US08/68940.
Partial ISR and WO mailed Nov. 12, 2008 for PCT/US08/68940.
Office Action dated Aug. 13, 2012 (+ English translation), in Chinese Patent Application No. 200880106074.6, 26 pages.
Office Action dated Feb. 27, 2013 (+ English translation), in Taiwan Patent Application No. 097125792, 20 pages.
Office Action mailed Nov. 8, 2012, in U.S. Appl. No. 11/828,219, 17 pages.
Official Action dated Nov. 1, 2012 (+ English translation), in Japanese Patent Application No. 2010-518263, 4 pages.
Third Office Action dated Jan. 29, 2013 (+ English translation), in Chinese Patent Application No. 200880106074.6, 31 pages.
European Examination Report, European Application No. 08781249.1, May 21, 2014, 5 pages.
Korean Office Action, Korean Application No. 10-2010-4004054, May 22, 2014, 7 pages.
Japanese Office Action, Japanese Application No. 2013-244815, Aug. 26, 2014, 7 pages (with English summary).

* cited by examiner

ON SCREEN DISPLAYS ASSOCIATED WITH REMOTE VIDEO SOURCE DEVICES

CROSS-REFERENCE TO RELATED APPLICATION

This application is a divisional of U.S. patent application Ser. No. 11/828,219, filed on Jul. 25, 2007, which application is incorporated herein by reference in its entirety.

FIELD

Embodiments of the inventions relate generally to techniques for generating an on screen display (OSD) and related techniques for managing a display with multiple potential video sources. In some embodiments, drawing commands are provided over a network and are used to create an OSD.

BACKGROUND

In current practice, High Definition (HD) programming content is delivered to consumers via video equipment such as DVD players, set top boxes (STBs), etc. in a compressed digital form that is produced by the content creator. The video equipment decompresses the media (video and audio) streams in order to display the video on the television (TV) screen. Program creators typically use expensive and high-quality compression equipment to ensure excellent picture quality and reasonable program bandwidths.

In order for the user to select preferences or control the video equipment, the video decoding product then, when appropriate, blends a graphics overlay or OSD stream containing menus, information, status, etc onto the program. The combined signal is then sent to the TV display using either an analog or digital signal in a form that is not compressed.

An OSD is an image that is presented along with one or more other images from a different source on a screen. The OSD may or may not be transparent such that the OSD and another image can be simultaneously seen. The OSD may be purely informational (such as an OSD indicating the current channel of a TV or a stock ticker) or a graphical user interface (GUI) that allows a user to select a feature through, for example, a remote control device. The OSD is often generated from a different source and is superimposed on another image such that a portion of the other image is partially or completely not displayed while the OSD is displayed. For example, a TV, DVD player, STB, or other device can generate information such as volume, channel, time information, or a menu in response to signals from a remote control device or the pressing of buttons on the TV, set top box, DVD player, or other video source device. In addition to being used in TVs, OSDs have also been used in connection with computer displays. Some video equipment boxes may include more than one video source device. Some video devices are both video source devices and video display devices.

The OSD signals can be generated inside control circuitry of the TV or inside other devices such as a set top box or DVD player and be provided remotely from these devices to the TV. For example, when a remote control device provides a channel change command to a TV, control circuitry in the TV may cause an OSD with the new channel to appear on the TV screen. Alternatively, if the remote control device provides a channel change command to a set top box, the set top box may generate OSD signals and provide the OSD signals to the TV to be displayed on the TV screen.

Referring to FIG. 1, a prior art system includes a video signal source 12 which provides compressed or uncompressed video to a set top box 16. Examples of the video source include a cable TV outlet and a satellite TV receiver. Examples of set top boxes include cable TV boxes and satellite TV boxes. Source 12 also provides audio signals, which will not be further discussed. Set top box 16 provides uncompressed analog video signals or uncompressed digital video signals to a display control circuitry 20 of a TV 18. As an example, uncompressed digital video signals may be provided between set top box 16 and display control circuitry 20 of TV 18 through a High Definition Multimedia Interface (HDMI). Display control circuitry 20 could receive video from other devices including a DVD (Digital Versatile Disc) player, DVR (digital video recorder), VCR (video cassette recording device), hand held video source device, or other device, in addition to or in replace of set top box 16.

The video signals are provided from display control circuitry 20 to display 30 to be displayed on screen 34. In the case in which OSDs are generated by set top box 16, the OSDs may be combined as part of the uncompressed video signals and sent to TV 18 to be displayed. Display control circuitry 20 includes a frame buffer 24 to present OSD signals that are combined with the uncompressed video in blender circuitry 26. Blender circuitry 26 provides the combined signals to display 30 to be displayed on screen 34.

Various attempts have been made to provide TV signals over home entertainment networks. A naïve approach to extending the system of FIG. 1 for use over a network (which does not have enough bandwidth to carry the raw video signal) would be to recompress the combined video and OSD information before transmission. However, compression equipment that would be affordable to include in a home video product would produce a noticeably degraded picture quality compared to the originally compressed program. Since a main motivation for a consumer to purchase a HD TV is to obtain improved picture quality and resolution, this would not be an acceptable result.

SUMMARY

In some embodiments, an apparatus includes interface circuitry to receive signals including video signals and drawing commands, and a command interpreter to receive the drawing commands and provide on screen display (OSD) signals in response to the drawing commands. Video processing circuitry processes the received video signals to provide processed video signals, and a blender to blend the OSD signals and the processed video signals to produce blended video signals including the OSD signals and the processed video signals.

In some embodiments, an apparatus includes interface circuitry to interface with a network outside of the apparatus, a display management module, and receiver circuitry. The display management module is to identify potential video source devices on the network and outside of the apparatus to potentially provide video signals to the apparatus through the interface circuitry and to direct the generation of an on screen display menu including symbols to represent the potential video source devices. The receiver circuitry to receiver a user selection of one of the video source devices from the OSD menu, and wherein the display management module arranges for the selected video source device to provide video signals through the interface circuitry for display.

In some embodiments, an apparatus includes drawing command generation circuitry to create drawing command signals which when properly interpreted cause the creation of on screen display video signals, video and command combining circuitry to combine the drawing command signals and video signals, and transmitters to transmit the combined video and command signals.

Other embodiments are described and claimed.

BRIEF DESCRIPTION OF THE DRAWINGS

Embodiments of the invention may be understood by referring to the following description and accompanying drawings that are used to illustrate embodiments of the invention. However, the invention is not limited to the details of these drawings.

DETAILED DESCRIPTION

Figure 1:
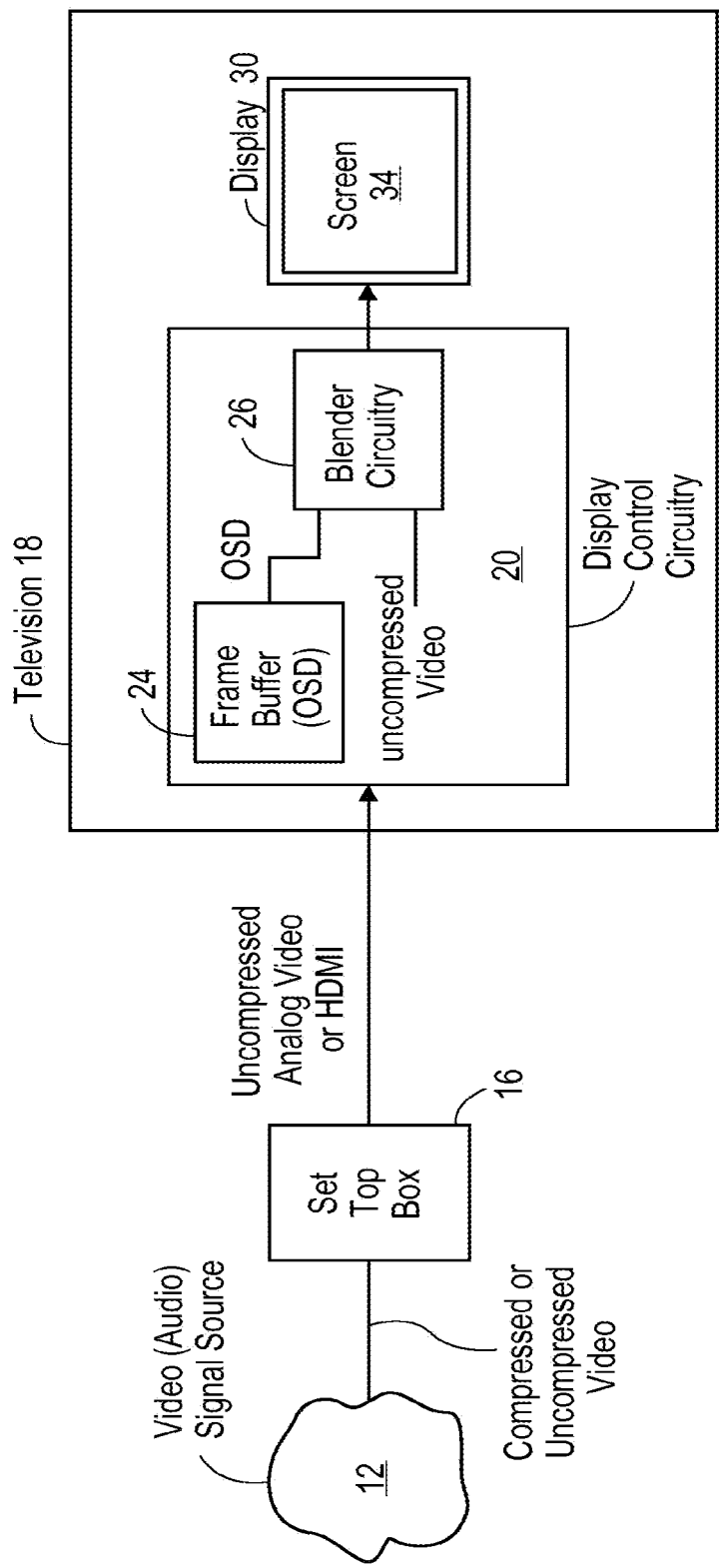
FIG. 1 is a block diagram representation of a prior art system in which OSD signals are provided as uncompressed video signals to display control circuitry.

The following disclosure describes providing drawing commands and video signals from a video source device, such as a set top box, to a remote video display device, such as a TV. The drawing commands may be used by the remote video display device to create OSD signals to be displayed along with other video signals. The video source device and video display device may be joined through a network that also allows other video source devices to be joined to the network and provide video signals and drawing commands to the video display device or another video display device. Some video source devices only send video signals, not also drawing commands, while other devices may send drawing commands but not video signals. The disclosure also describes the operation of a display management module and related modules and circuits that allow a user to select from among multiple independent video source devices.

Some embodiments allow the separation of the TV viewing experience from close proximity with the original TV signal receiving/decoding equipment. For example, a system may include a cable STB in one room, and a TV in another, while providing interactive OSD control available to a TV adjacent to the STB. In some embodiments, the digital TV program content (called the media stream) is sent to the TV in its original, compressed form. One or more separate OSD graphic connections may be made, on which menus, program information, status information, etc. may be presented on the same display. In some embodiments, the OSD stream contains pixel-based drawing commands, which can include color and transparency information. In some embodiments, if multiple streams are allowed, the OSD streams may also contain information to allow the information to be "stacked" or allow the display of only the top-most (e.g. most important) information. In some embodiments, through the use of these commands, a remote device (such as a STB or DVR), which is attached to the TV via commodity network interfaces, can place an OSD display on the TV with essentially the same quality and performance as for a directly attached TV. Some video equipment boxes may include more than one video source device. For example, a video equipment box could receive signals from both a cable TV outlet and a DVD player and could provide either to the remote video display device. In some embodiments, there are video devices that are both a video source device and video display device.

Figure 2:
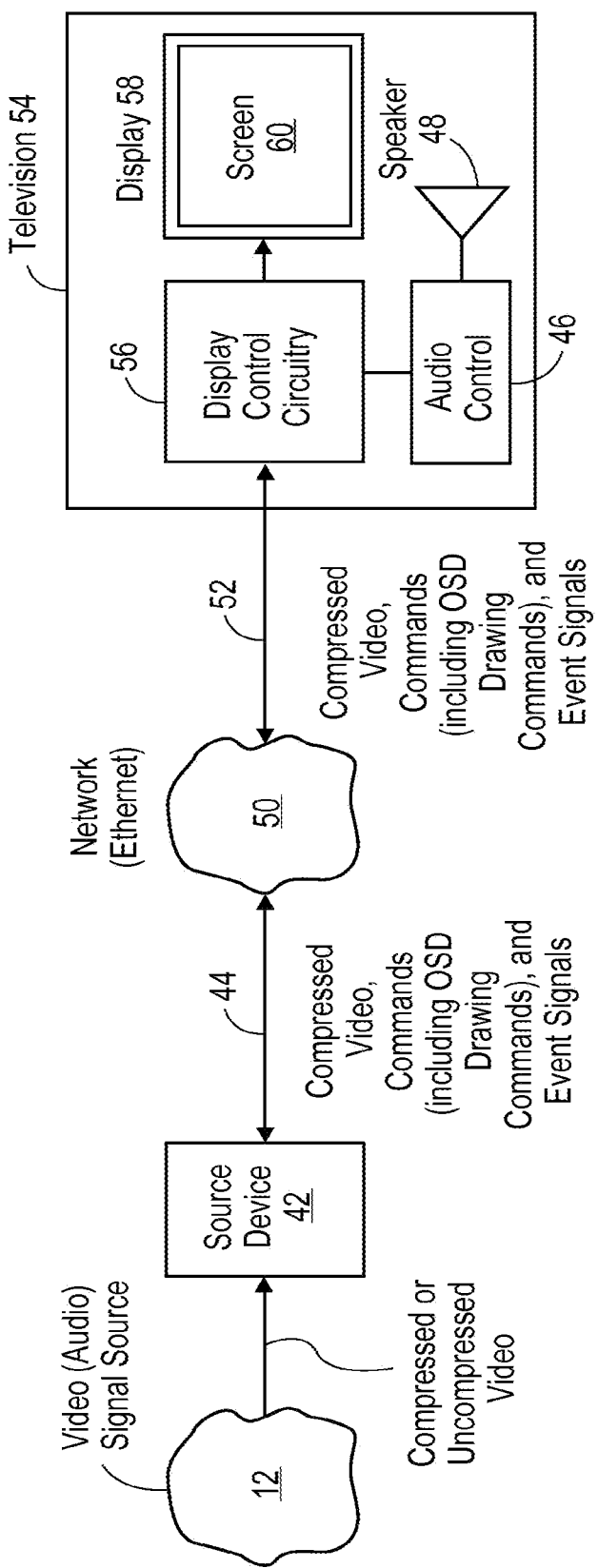
FIG. 2 is a block diagram representation of a system according to some embodiments of the inventions in which OSD signals are generated in display control circuitry in response to commands provided over a network.

Referring to FIG. 2, a system includes video signal source 12 which provides compressed or uncompressed analog or digital video to a video source device 42 (such as a STB). Examples of video sources include a cable TV outlet and a satellite TV receiver. Examples of STBs include cable TV boxes and satellite TV boxes. Source 12 also provides audio signals. There may be a compression device between source 12 and video source device 42. Video source device 42 provides compressed video signals and commands including OSD drawing commands through conductors 44 to a network 50.

As an example, network 50 may be an Ethernet network, which may communicate with devices in addition to video source device 42 and TV 54, which is an example of a video display device. Alternatively, network 50 may employ a scheme different than Ethernet. In some embodiments, network 50 has a low enough bandwidth that it could not consistently carry uncompressed video signals and, accordingly, video source device 42 provides compressed video signals. In other embodiments, network 50 has the bandwidth to carry compressed video signals. Network 50 provides the compressed video and command signals on conductors 52 to TV 54. Conductors 54 may be a single set of conductors on which signals are conducted bi-directionally. Alternatively, conductors 54 may comprise multiple sets of conductors in which signals are passed in different directions. Display control circuitry 56 creates OSD signals in response to the drawing commands and provides them along with video signals to be displayed on screen 60 of display 58.

In some embodiments, a drawing command or another command (such as an audio command) may cause audio signals to be produced at a speaker. For example, in FIG. 2, audio control circuitry 46 causes a speaker 48 to produce sound in response to such a command. As an example, the sound may be a sound effect that corresponds to a drawing command. For example, pushing a button may result in a beep sound. When the device receives a sound, it may mix it with other sounds to be sent to a speaker. In some cases, a command may carry a sound wave, and in other cases, the receiving device may have pre-stored sound waves that can be activated in response to the command. Of course, other audio signals may be associated with video signals independent of the drawing commands as they have been for years in the prior art.

Figure 3:
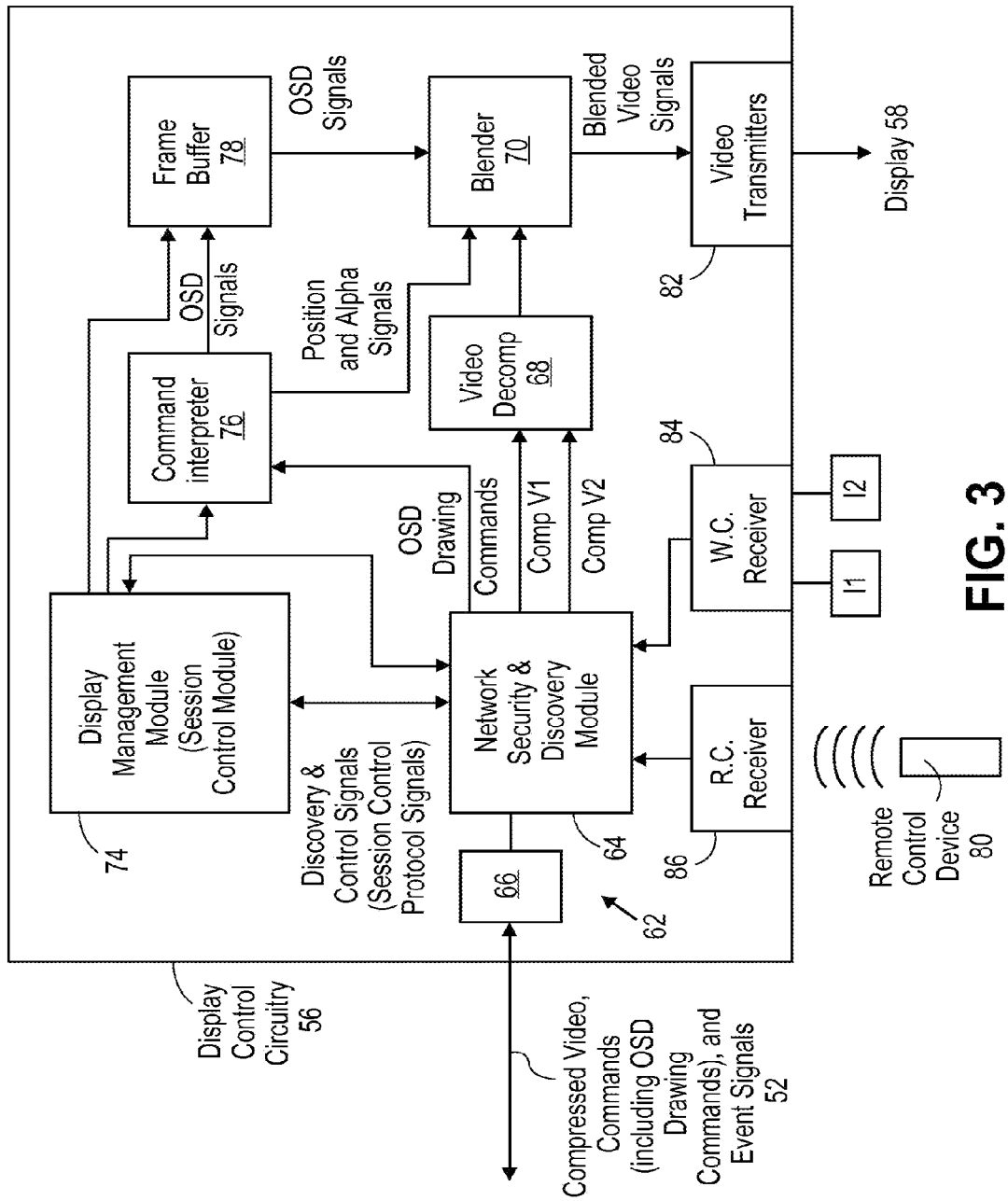
FIG. 3 is a block diagram representation of details of the display control circuitry of FIG. 2 according to some embodiments of the inventions.

FIG. 3 illustrates some ways in which display control circuitry 56 can be implemented. However, display control circuitry 56 may be implemented in various other ways. Interface circuitry 62 includes transmitters and receivers 66 to receive video signals and commands from conductors 52 and provides event signals to conductors 52 as described below. In the example of FIG. 3, interface circuitry 62 also includes network security and discovery module 64 and transmitter and receiver circuitry 66. The various signals on conductors 44 and 52 may be multiplexed, packetized, or otherwise carried on the conductors. Various types of signaling may be used. In some embodiments, the pixel-based graphics commands and event signals are sent using a standard TCP/IP connection. The conductors may carry signals bidirectionally (including simultaneous or sequential bidirectional signaling). The conductors may be divided into sets that each carry signals undirectionally.

Network security and discovery module 64 interfaces between network 50 and certain components of display control circuitry 56 as shown in FIG. 3. Network security and discovery module 64 also provides security. The commands and other signals may be encrypted. As an example, network and security module 64 may hold a private key for cryptography. Compressed video signals, such as V1 and V2, are provided to video decompressor 68 which provides decompressed video signals to blender 70. As an example, the video signals may be according to one of the MPEG standards such as MPEG4 (or another standard) and video decompressor 68 decompresses signals according to one or more of those standards. Network security and discovery module 64 provides OSD drawing commands to command interpreter 76. The OSD drawing commands are in response to the drawing commands received on conductors 52. The drawing commands provided to command interpreter 76 may be identical in form to those received by interface 62 or may be in different form. For example, the drawing commands received by interface might be in packets or symbols and be sent with differential signaling, and the drawing commands provided to command interpreter 76 might not be in packets or symbols and might be sent with single ended signaling. Further, the voltage swing and frequency may be different. Likewise, the drawing commands may change form through network 50.

Command interpreter 76 creates OSD signals to be displayed in response to the OSD drawing commands as described below. The OSD signals are provided by command interpreter 76 to a frame buffer 78 which provides the OSD signals to blender 70. Command interpreter 76 provides position and alpha (transparency) information signals to blender 70 which indicates position and alpha information for the OSD signals provided by frame buffer 78. Alternatively, the position and alpha information can be provided from frame buffer 78. Blender 70 blends the video signals and OSD signals and provides the blended signals to video transmitters 82, which provide the blended signals to display 58 to be displayed on screen 60.

Network security and discovery module 64 also provides discovery and control signals to a display management module 74. Display management module 74 (which may include a session control module) manages the display resources and grants access to the display resources and screen geometry. Display management module 74 coordinates the delivery and display of media content at the display device by granting access to resources of TV 54. Display management module 74 advertises the display on the network as discussed below.

Remote control receiver 86 receives wireless signals (for example, infrared signals) from a remote control device 80 and provides corresponding remote control signals to network security and discovery module 64. Remote control device 80 may include buttons and pointer capability. The remote control device may use IR (infrared), RF (radio frequencies), or any other signaling mechanism to indicate the buttons that the user has pressed. Wired control receiver 84 receives signals from input devices I1 and I2. Devices I1 and I2 may be push buttons, cursor control devices (for example, a mouse), pointer devices, or some other input devices. Wired control receiver 84 provides a corresponding signal network security and discovery module 84. In response to at least some received remote control or wired control signals, network security and discovery module 64 sends an event signal to network 50 through conductors 52. Details of the event signals are described below.

In some embodiments, all signals from remote control receiver 86 and wired control receiver 84 are provided to network security and discovery module 64. In other embodiments, only some signals (such as those that will result in an event signal) are provided to network security and discovery module 64. Accordingly, there may be intermediate control circuitry between remote control receiver 86 and network security and discovery module 64, and between wired control receiver 84 and network security and discovery module 64 that only passes certain signals to network security and discovery module 64. For example, in some embodiments, a control signal to raise the volume of the TV is handled by network security and discovery module 64, and in other embodiments, such a control signal is handled by other control circuitry.

Figure 4:
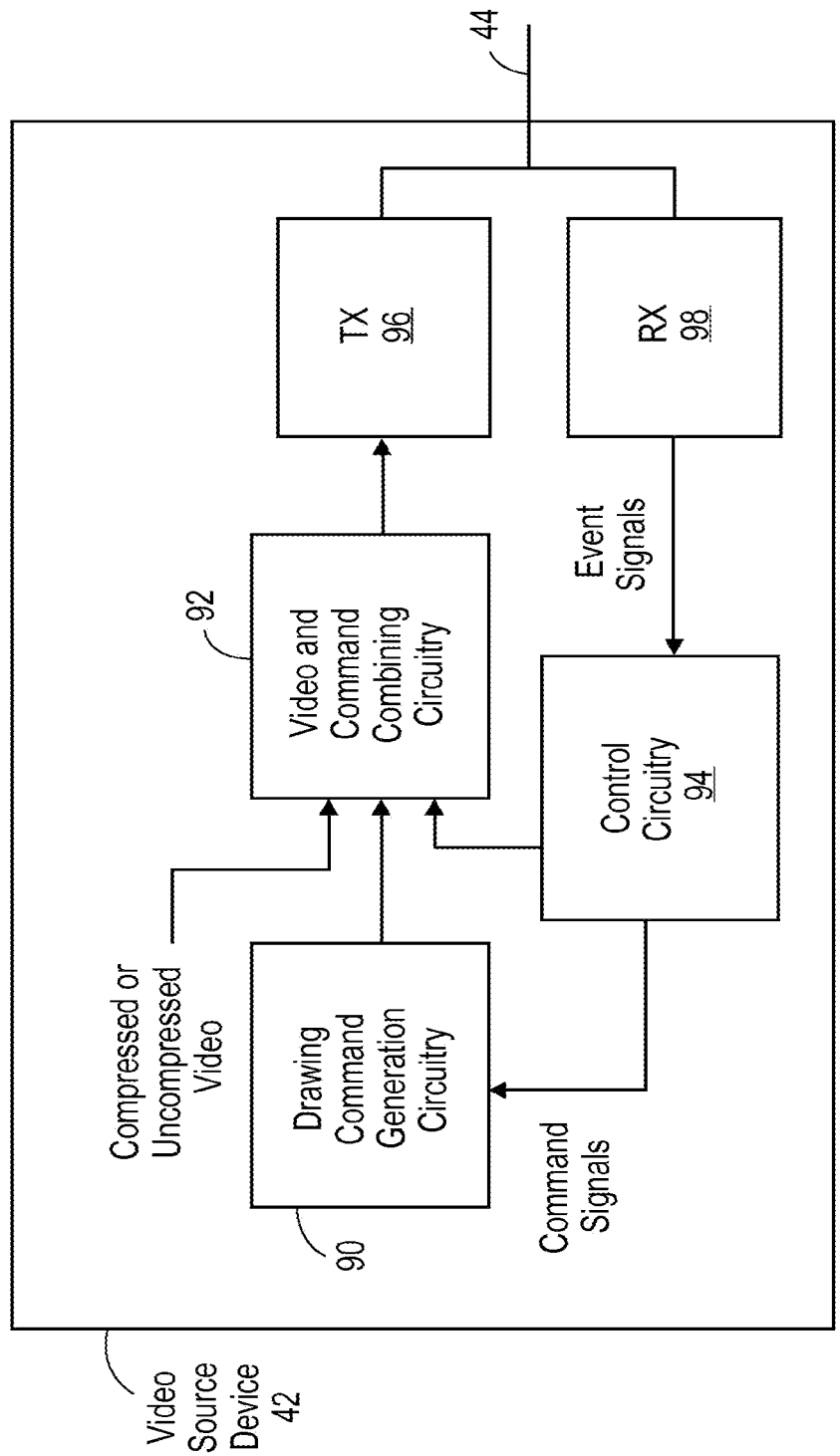
FIG. 4 is a block diagram representation of a video source device of FIG. 2 according to some embodiments of the inventions.

There are many ways in which video source device 42 may be implemented. FIG. 4 illustrates some components that may be in some embodiments of video source device 42 but other embodiments do not include all of these components and in some embodiments may include additional components. Referring to FIG. 4, drawing command generation circuitry 90 creates drawing commands which are combined with video signals in video and command combining circuitry 92 combines the video signals and drawing commands in packets or through multiplexing or some other technique. The video signals and drawing commands may be shared in packets or provided in different packets. Video signals and drawing commands may be interspersed or video signals may come first followed by drawing commands or vice versa. The combined video signals and drawing commands are transmitted by transmitters 96 to conductors 44. Receivers 98 receive signals (such as event signals) on conductors 44 and provide them to control circuitry 94. Control circuitry 94 may cause drawing commands to be generated in response to some of the event signals or in response to other signals or conditions. Conductors 44 may be a single set of conductors that carry signals bi-directionally or may be comprise more than one set of conductors on which signals are transmitted in different directions.

Figure 5:
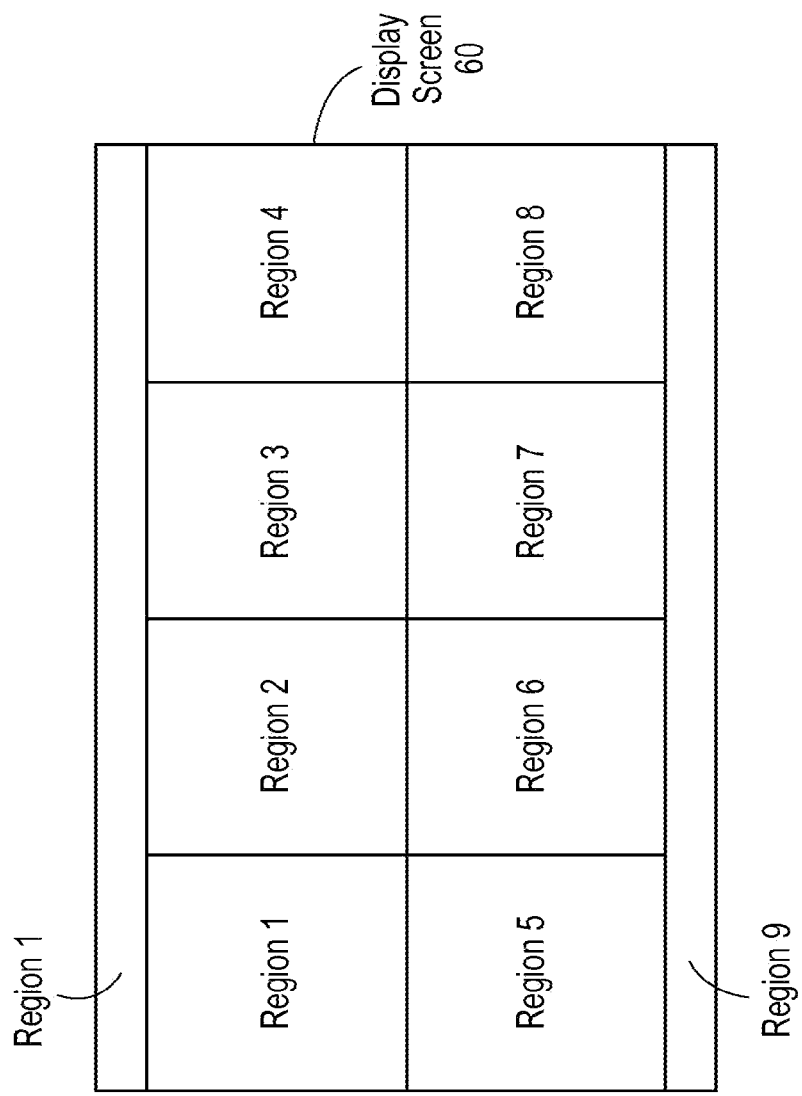
FIG. 5 is a block diagram representation of a display screen including different regions according to some embodiments of the inventions.

FIG. 5 shows how an image or images on screen 60 of display 58 may be provided in different areas or regions (such as regions 1-9) as shown. The regions do not have to have rectangular shaped and may change position over time. In some embodiments, an object may move across the screen by changing the position in the region.

Figure 6:
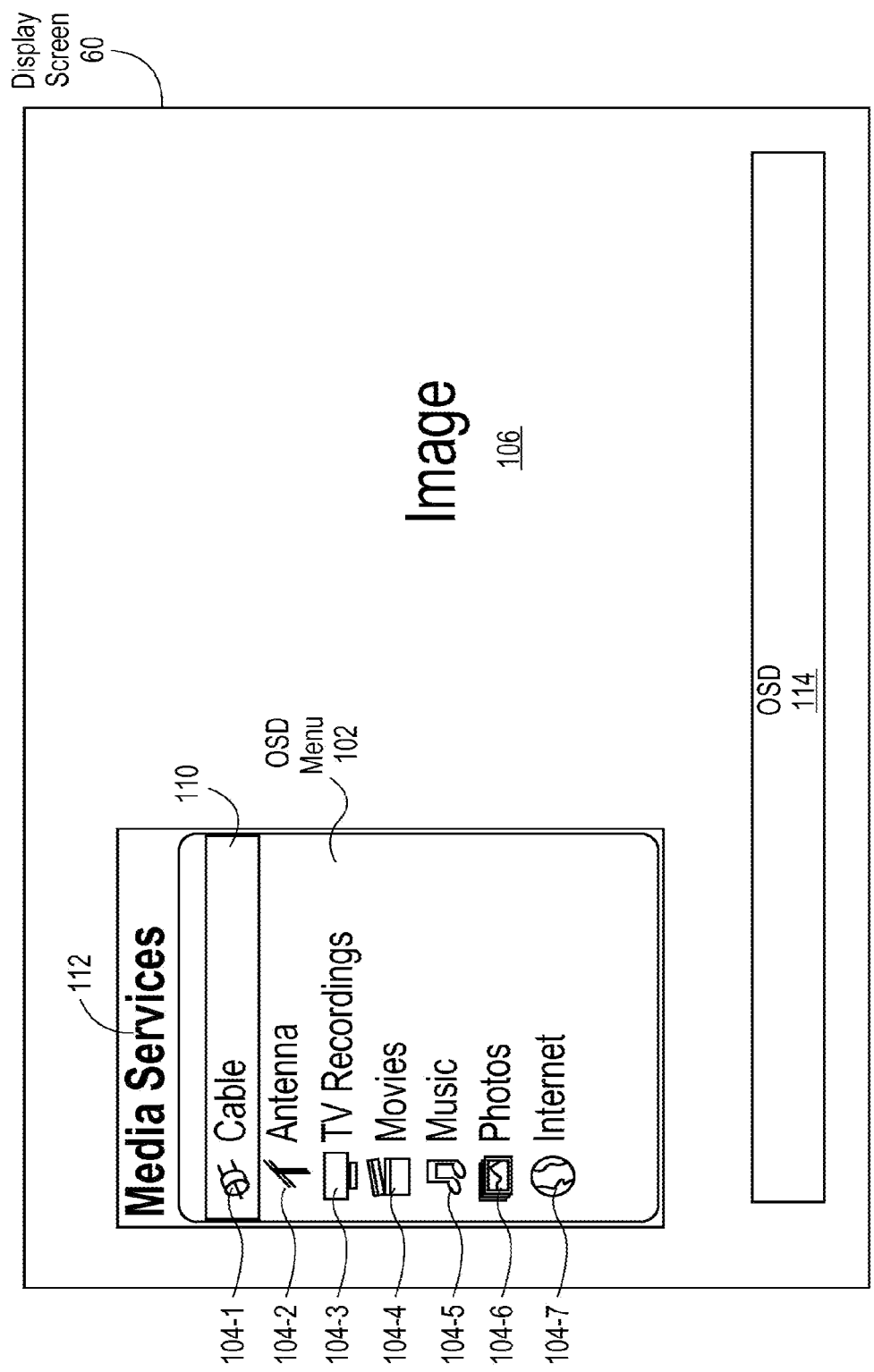
FIG. 6 is a block diagram and graphical representation of a display screen including OSDs according to some embodiments of the inventions.

FIG. 6 shows an image 106 and an OSD menu 102 on screen 60. OSD menu 102 includes icons and words 104-1 (Cable), 104-2 (Antenna), 104-3 (TV Recordings), 104-4 (Movies), 104-5 (Music), 104-6 (Photos), and 104-7 (Internet). Icon and words 104-1 are highlighted (selected) as shown by an identifier band 110. The words "Media Services" appears at the top of the OSD menu to describe what is included in the menu. An OSD 114 is also included in screen 60. OSD 114 may be purely informational (such as a stock ticker) or an interactive OSD like OSD menu 102. An interactive OSD is one which a user can select an item on the OSD to activate.

Figure 7:
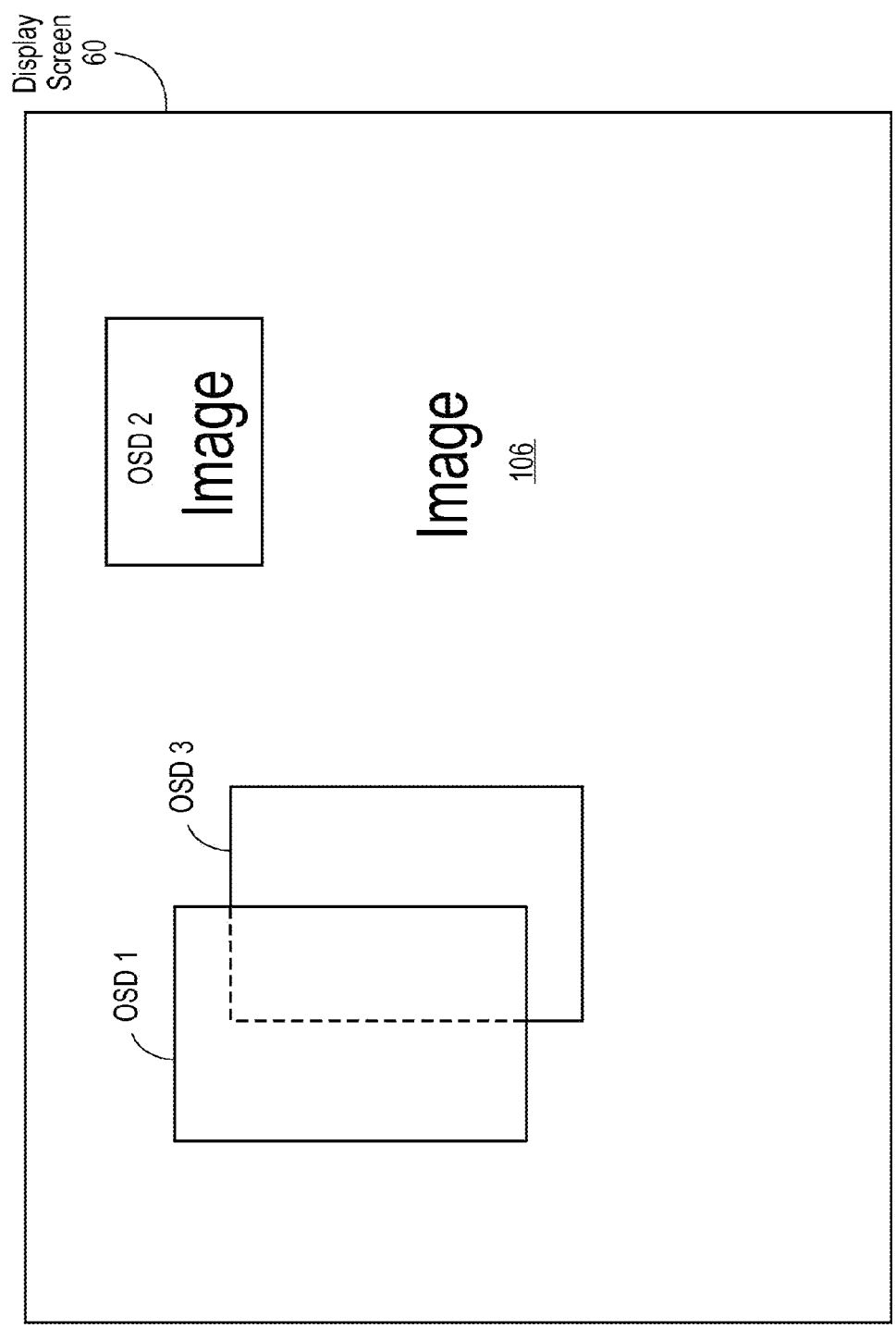
FIG. 7 is a block diagram representation of a display screen including OSDs according to some embodiments of the inventions.

FIG. 7 shows an image 106 and OSDs 1, 2, and 3. OSD 2 is partially transparent so that the image shows beneath it. OSD 3 is partially covered by OSD 1. In some embodiments, the OSD 3 could be activated so that it would be on top of OSD 1 similar to a window in a computer graphical user interface. In some embodiments, one OSD does not obscure another OSD. Different portions of screen 60 may display different video signals from the same video source device or from different video source devices (such as in a picture in picture (PIP)).

Figure 8:
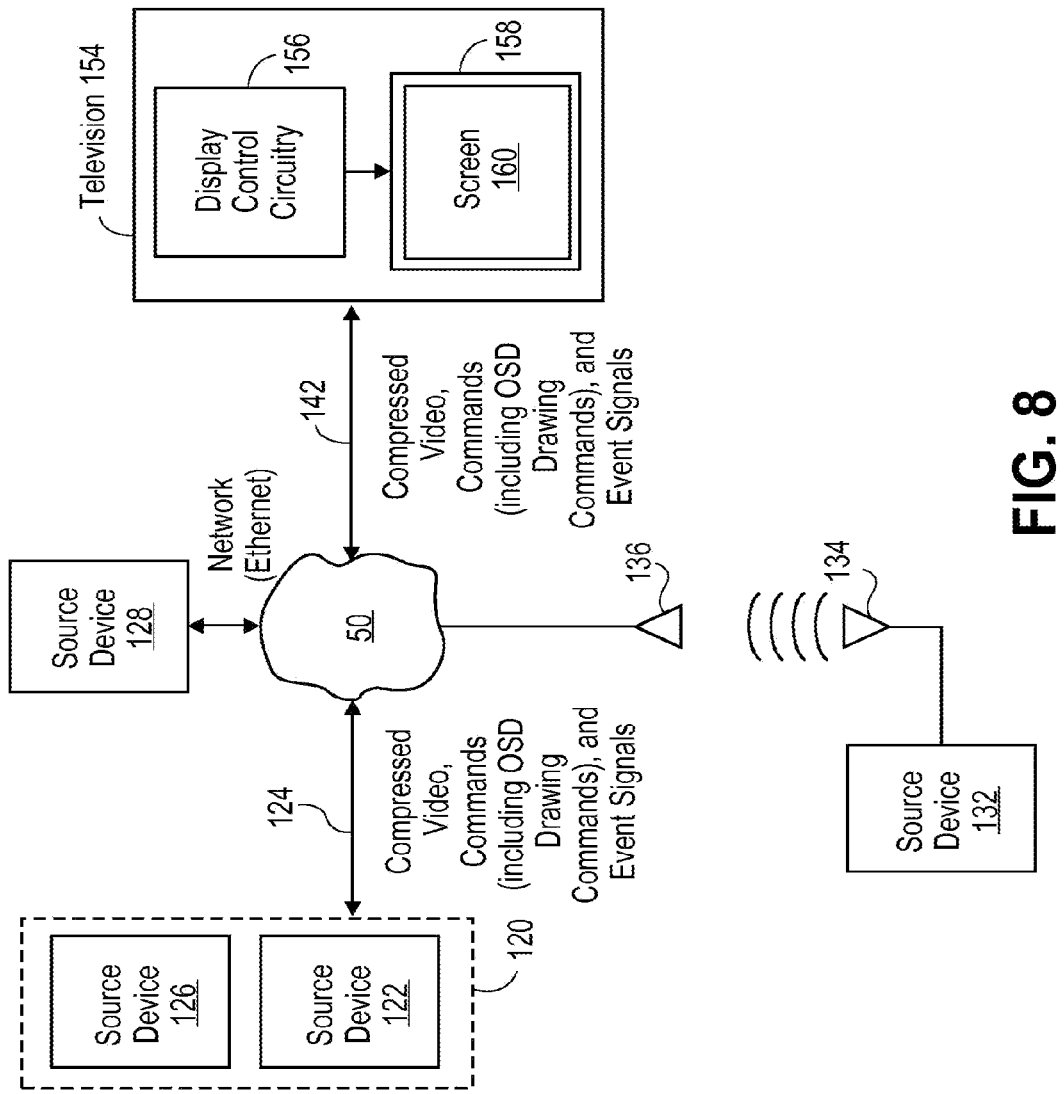
FIGS. 8 and 9 are each a block diagram representation of a system similar to that of FIG. 2 with additional video source devices according to some embodiments of the inventions.

Referring to FIG. 8, a video device 122 is coupled to network 50 through conductors 124. Video source device 122 and video source device 126 included in video equipment box 120 are coupled to network 50 through conductors 124. Video device 128 is coupled to network 50 through conductors. Video source device 132 is wirelessly coupled to network 50 through wireless antennas 134 and 136. TV 154 is coupled to network 50 through conductors 142. TV 154, display control circuitry 156, display 158, and screen 160 may be the same as or different than TV 54, display control circuitry 56, display 58, and screen 60 in FIG. 2.

Figure 9:
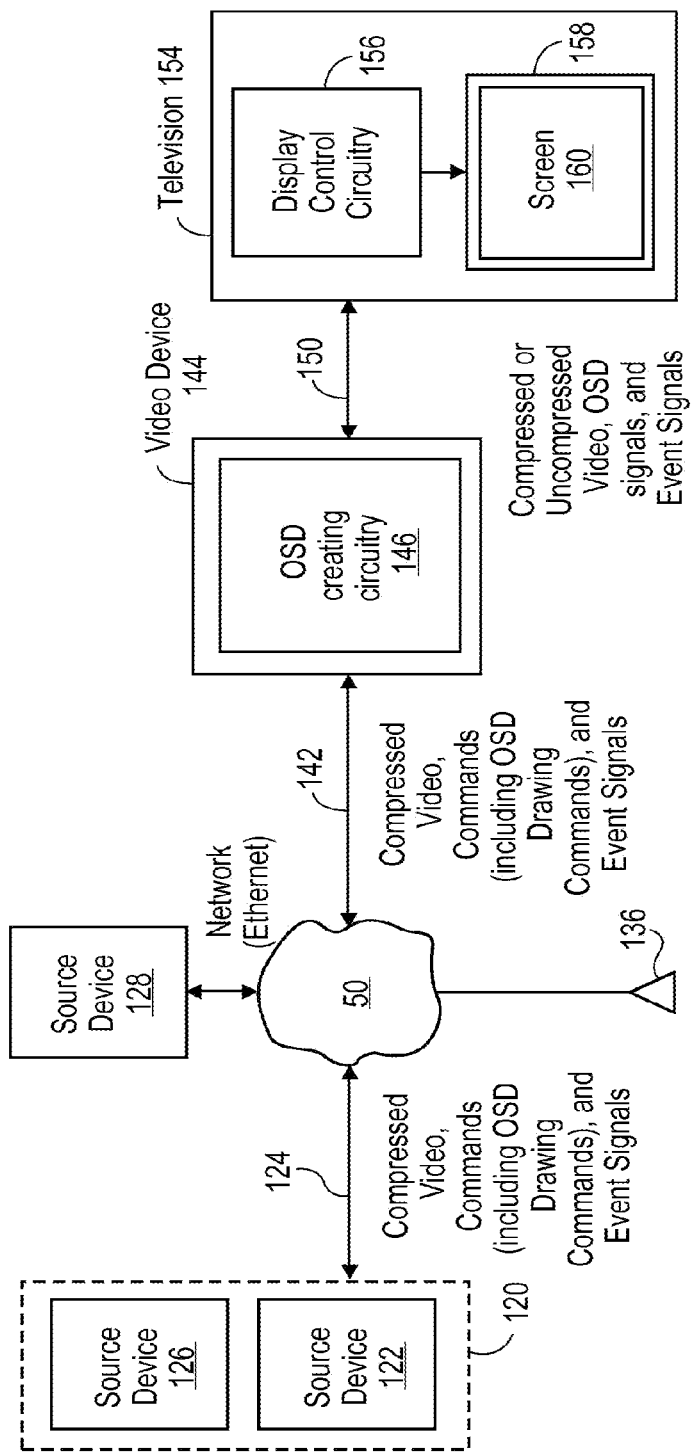

FIG. 9 is like FIG. 8 except that video device 144 which includes an OSD creating circuitry 146 is coupled between network 50 and TV 154 through conductors 142 and 150. The OSD signals may be generated from circuitry 146 rather than in display control circuitry 156 in response to the drawing commands from a video source device.

EXAMPLE COMMANDS

The following provide details of some example commands. Some embodiments use some or all of the commands with the details below or different details. Some embodiments use additional and/or different commands. Many of the pixel-based drawing commands have variants specifying which data at the specified locations should change. Examples of supported formats include: Red-Green-Blue (RGB) color information, Red-Green-Blue-Alpha (RGBA) color and transparency information, or Alpha (A) transparency information. The pixel-based drawing commands may include an origin pixel location as (x,y) Cartesian coordinates, and width by height (W×H) size information. As an example, the (0,0) location may be the upper left corner of the screen, and areas grow downward and to the right from the origin pixel location. As an example, commands may send additional information as a data payload of the command, with the actual information sent determined by the command type.

Examples of pixel-based drawing commands to be sent from a video device (such as video source device 42) to display control circuitry (such as display control circuitry 56) include the following. Some embodiments do not include all of these commands and some embodiments include additional drawing commands.

Fill an area with a single value (RGB, RGBA, or A). The color value is sent as a data payload of the command. Filling with RGB leaves the Alpha (A) value of the pixels unchanged. Similarly, filling with A leaves the RGB values of the pixels unchanged.

Set the pixels in an area with (RGB, RGBA, or A) values as specified as a data payload in the command. The pixel data may be compressed or uncompressed.

Blend pixels with a single RGBA. The color value is sent as a data payload of the command. The blending operation is defined in terms of the Porter and Duff "Over" operator. The new RGBA value can be selected to be considered as "Over" the old data, or the old data can be selected to be considered "Over" the new data.

Blend pixels in an area with (RGB plus constant A, RGBA, or A plus constant RGB) values as specified as a data payload in the command. The pixel data may be compressed or uncompressed. The blending operation is defined in terms of the Porter and Duff "Over" operator. The new data can be selected to be considered as "Over" the old data, or the old data can be selected to be considered "Over" the new data.

Copy an area of the screen from another area. In some embodiments, the area specified by the origin pixel (x,y) and size (W×H) information is the area to be copied to, and the origin pixel location of the area copied from is sent as a data payload of the command. The copy involves all elements of each RGBA value.

Blend an area from one buffer with an area from another buffer. In the some embodiments, the blend areas are specified via origin pixel locations (x,y) in each buffer, and a size (W×H). The blend is defined in terms of the Porter and Duff "Over" operator. The destination (modified) buffer can be considered either "Over" the source (unmodified) buffer, or the source buffer can be considered "Over" the destination buffer.

Set the contents of a color map (RGB, RGBA, or A) to be used in later commands.

Set pixels in an area based on the values in a color map. The data payload in the command specifies the index of the color map entry whose value should be used for each pixel. The indices may be typically 1, 2, 4, or 8 bits wide, but may be some other width.

Audio signals (such as for sound effects) associated with the drawing commands may be sent. The commands may include an audio clip or sampled digital waveform, and specify a sample rate, bit resolution, and number of channels.

Note that when RGB values are specified in a data payload, in some embodiments, a single A value may be provided for the command. The RGB values may be variable and the A value may be fixed, or the A value may be variable and the RGB values may be fixed.

The command protocol may also include a set of control commands. Examples include the following, but some embodiments do not include all of these and some embodiments include additional control commands. Note the discussion of session control below.

Establish authorization to use the TV's display.

Declare the region or regions of the TV display that will be modified.

Declare a rendering priority value for the session. This provides information that is used to handle cases where multiple OSD streams will "collide"; i.e. where the regions they will modify overlap.

Allocate and free memory buffers for holding data.

Specify the mapping of the memory buffers to positions on the screen, and the stacking order of the buffers if there is an overlap.

Support for determining the round-trip time calculation via a synchronization command. Additional data may be provided that will be reflected back to the sender via the event stream (described below).

The remote OSD protocol may also provides a way for the display to send user input event signals to the remote OSD source device. For example, a user may activate buttons on remote control device 80 or inputs I1 or I2 to create signals to control a remote device (such as video source device 42) or respond to interface with an OSD in such a way as to cause activity of the remote device. For example, if an OSD menu (such as menu 102 in FIG. 6) is on screen 60, pressing buttons on remote control device 80 can select a particular options and cause display control circuitry 56 to sent event signals to a video device (that is remote from TV 54) such as video source device 42. The video device responds to the event signals as specified. Network security and discovery module 64 or other circuitry not shown may interpret the signals from remote control device 80 or inputs I1 and I2 and decide whether to create event signals from a remote video device (that is, remote from TV 54). For example, in some embodiments, a volume change command does not cause an event signal but may instead be handled within the TV. A channel change command may cause an event signal to be generated. The user and TV may not be in the same room as the device controlling the TV via the remote OSD protocol. Therefore, the remote OSD protocol may be used to send messages from the TV back to the remote OSD source device indicating any of the following events as examples for some embodiments, but not all of these examples are included in other embodiments:

- That a particular key was pressed, and the identity of the key
- That a particular key was released, and the identity of the key
- That a pointing device (e.g. a mouse) was moved, and the amount and direction of the movement.
- That a synchronization command was received, and the additional data that arrived with it.
- Status results for any commands that provide status (e.g. buffer allocation, etc.).

In some embodiments, the remote graphics commands may allow low cost implementations of both the source and destination devices. In particular, in some embodiments, fixed layouts for common information may be used to allow hardware implementations to easily parse the graphics stream.

Session Control

The following describes details that may be used in some embodiments. Other embodiments may use different details. Referring to FIG. 3, display management module 74 performs a session control protocol to manage remote OSD connections. The following is provided as background that may be useful to understanding some embodiments. Current TVs are created with a specific number of input ports, each decoding a specific video format. For example, some TVs have two HDMI inputs and two component video inputs. Normally, the TV is created with a simple OSD menu to select from the set of inputs to allow the user to choose between them. In the some embodiments, in the case of devices that deliver the video content and OSD over the network, the TV has no idea of the number or type of input devices that may be encountered. In addition, the number and types of devices can change when a consumer purchases new equipment, or retires old equipment. The session control protocol provides a way for the user to find devices on his or her home network that can provide a video signal to the TV, and to select the one that he or she wishes to use at any time. In some embodiments, more than on video source can be selected at a time.

The session control protocol may be produced by display management module 74. In some embodiments, display management module 74 uses the session control protocol to do at least the following, but in other embodiments, the session control protocol does not do all of these and may be do additional tasks:

- Ask which devices on the network are capable and willing to provide video input to the TV.
- For those devices that are capable of controlling the TV, ask for an identifier for presentation to the TVs user (e.g. a name and/or icon).
- Provide a message to the device selected by the user, containing a request to control the TV remotely, and provide authorization information that the remote device will send using the remote OSD protocol at the initiation of the connection.
- Revoke the remote OSD connection if the user indicates that he or she wants to change input source.
- Provide control of additional informational devices that may use the remote OSD protocol.

A primary function of display management module 74 is to ensure that there is always something displayed on the TV as long as it is powered on. At times, there will be no remote device selected to provide the OSD display and video material for the TV. These times are, for example, the first time a TV is turned on, when the selected controlling device disappears, or when the user indicates that the selected controlling device connection should be terminated, and a new video source be selected. In these cases, display management module 74 will normally send out messages in the session control protocol to find all devices that can provide OSD control to the TV, along with the identifying information. Display management module 74 then arranges for an OSD menu to display the possible choices to the user and allow the user to select one. Once the selection is made, the selected device is asked to begin controlling the TV. In some embodiments, the OSD menu for selecting controlling devices is generated by a User Interface (UI) module within display management module 74 of TV 54. The UI module may be in one of the components shown in FIG. 3 or be an additional component.

Another function of display management module 74 is to mediate between conflicting uses of the TV screen's display. Normally only one OSD graphics stream sent to a TV will be in main control of the TVs operation, but other streams may be sent by multiple devices that wish to provide information to the user. For example, one device could output a stock ticker at the bottom of the screen, and another could popup a notification symbol when new email arrives for the user.

Devices can request the ability to send such informational or interactive displays by sending a message to display management module 74 of the TV, detailing their requested use. Display management module 74 can either deny the request, or can grant the request by sending a grant message. The grant message provides an authorization token and priority as described below.

Display management module 74 sends each source of an OSD graphics stream an authorization token, along with a maximum priority value. Each OSD graphics stream provides this token and priority during the initialization phase of the OSD graphics connection to the TV. If the authentication token is invalid or has been revoked, the connection is terminated.

Once an OSD graphics stream has successfully connected and has its authentication token accepted, it can begin sending graphics commands. However, before it can modify any portion of the screen, it declares which area of the screen will be modified. This notification permits the TV to deal with conflicting requests from multiple sources, as described below. Note that a source may change its declared modification area as its needs grow or shrink. For example, a source may at one time wish to use the whole screen to output a menu, while at another time may need little or no screen area.

As each device declares which area of the screen it will modify (in the OSD graphics stream), display management module 74 looks for area of conflict; i.e. areas that two or more streams have declared that they will modify. Depending on the capabilities of the TV, display management module 74 may choose to take one of the following actions in the case of conflicts:

Blend the conflicting areas together, with the highest priority stream being the most visible (more opaque), and lower priority streams less visible (more transparent).

Display only the highest priority stream and not show the remainder.

Blend some streams and omit others.

When display management module 74 decides not to display an area request by a stream it may, depending on the resources available, either remember would have been shown in the area or discard it. If it has sufficient memory that it can remember what would have been shown, then, when the conflict ends (because another stream stopped using the region), display management module 74 could display the stream's content with no further help from the stream's originator. However, if the TV has insufficient resources, it may send visibility events to the stream's originator that informs the sender of its visibility status changes. That is, it first informs the originator that its output is partially or fully obscured, and later it informs it that it no longer is obscured. The sender is then responsible for "repainting" the area. That is, the OSD originator sends graphics commands to reconstruct the image or images that it wishes to display on the TV.

As noted above, some embodiments include some of the details recited above regarding session control but not others of the details.

Additional Information and Embodiments

The various modules described herein may be performed in hardware or in a combination of hardware and software and/or firmware.

There may be intermediate structure between the illustrated components. The various components described or illustrated herein may have additional inputs or outputs which are not illustrated or described. In actual implementations of the systems of the figures, there would be additional circuitry, control lines, and perhaps interconnects which are not illustrated. When the figures show two blocks connected through conductors, there may be intermediate circuitry that is not illustrated. The conductors mentioned herein do not have to be of continuous material. For example, they may include vias or other connection structures. The shape and relative sizes of the blocks is not intended to relate to actual shapes and relative sizes. The fact that an arrow between blocks is shown in only one direction does not mean that there is not communication in the other direction. A single line between blocks does not mean there are not other conductors between the blocks.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." Likewise, when it is said that A is in response to B, A may be in response to the combination of B and C.

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The invention is not restricted to the particular details described herein. Indeed, many other variations of the foregoing description and drawings may be made within the scope of the present inventions. Accordingly, it is the following claims including any amendments thereto, not the above description, that defines the scope of the invention.

What is claimed is:

1. An apparatus comprising:
   interface circuitry to interface with a network outside of the apparatus;
   a display management module to identify potential video source devices on the network and outside of the apparatus to potentially provide video signals to the apparatus through the interface circuitry and to direct generation of an on screen display (OSD) menu including symbols to represent the potential video source devices; and
   receiver circuitry to receive a user selection of at least one of the potential video source devices from the OSD menu,
   wherein the display management module is further configured to provide a token to a selected video source device corresponding to the user selection, and to allow an OSD graphics stream from the selected video source to be displayed responsive to receiving the token back from the selected video source device and validating the token.

2. The apparatus of claim 1, further comprising display circuitry with a screen to display the OSD menu.

3. The apparatus of claim 1, wherein the display management module causes an event signal to be sent to the selected video source device to indicate to the selected video source device that it has been selected.

4. The apparatus of claim 1, wherein a user can select more than one video source device to provide video signals through the interface circuitry to be displayed.

5. The apparatus of claim 1, wherein the display management module provides tokens and priority to selected video source devices corresponding to the user selection during initialization phase of an OSD graphics connection.

6. The apparatus of claim 5, wherein the display management module may allow the selected video source devices to provide OSD graphics streams to be displayed and to resolve any conflicts between the OSD graphics streams.

7. The apparatus of claim 1, wherein the display management module allows only one video source device to be in main control of what is to be displayed, but other video source devices can provide other signals to be displayed.

8. The apparatus of claim 1, further comprising user selection receiving circuitry to receive commands from a user which cause the display management module to select a different one of the potential video source devices.

9. A method comprising:
   identifying potential video source devices on a network outside of an apparatus to potentially provide video signals to the apparatus through an interface circuitry for the apparatus with the network;
   generating and displaying an on screen display (OSD) menu including symbols to represent the potential video source devices;

receiving a user selection of at least one of the potential video source devices from the OSD menu;

providing a token to a selected video source device corresponding to the user selection; and allowing an OSD graphics stream from the selected video source to be displayed responsive to receiving the token back from the selected video source device and validating the token.

10. The method of claim 9, further comprising transmitting an event signal to the selected video source device to indicate to the selected video source device that it has been selected.

11. The method of claim 9, wherein a user can select more than one video source device to provide video signals through the interface circuitry to be displayed.

12. The method of claim 9, further comprising providing tokens and priority to selected video source devices corresponding to the user selection during initialization phase of an OSD graphics connection.

13. The method of claim 12, further comprising allowing the selected video source devices to provide OSD graphics streams to be displayed and resolving any conflicts between the OSD graphics streams of the selected video source devices.

14. The method of claim 9, further comprising allowing only one video source device to be in main control of what is to be displayed on the apparatus while one or more other video source devices can provide other signals to be displayed.

15. The method of claim 9, further comprising receiving a command from a user indicating a selection of a different one of the potential video source devices, and in response arranging for the different one of the potential video source devices to provide other OSD graphics streams through the interface circuitry for display.

\* \* \* \* \*